Jan. 1, 1929.

J. V. WASHBURNE 1,697,581

APPARATUS FOR MAKING FIXTURES FOR SHADE ROLLERS

Filed July 24, 1926   9 Sheets-Sheet 4

Jan. 1, 1929.　　　　　　　　　　　　　　　　　　　　1,697,581
J. V. WASHBURNE
APPARATUS FOR MAKING FIXTURES FOR SHADE ROLLERS
Filed July 24, 1926　　　9 Sheets-Sheet 5

Jan. 1, 1929.  
J. V. WASHBURNE  
1,697,581  
APPARATUS FOR MAKING FIXTURES FOR SHADE ROLLERS  
Filed July 24, 1926  9 Sheets-Sheet 9

FIG. 10.

WITNESS  
INVENTOR  
J. V. Washburne  
BY  
Denison & Thompson  
ATTORNEYS

Patented Jan. 1, 1929.

1,697,581

UNITED STATES PATENT OFFICE.

JAMES V. WASHBURNE, OF FULTON, NEW YORK.

APPARATUS FOR MAKING FIXTURES FOR SHADE ROLLERS.

Application filed July 24, 1926. Serial No. 124,619.

This invention relates to apparatus for making shade roller attachments of the class set forth in my Patent 912,636, issued February 16, 1909 in which a pair of opposed catch plates are slidably mounted upon a supporting disk which is secured to one end of the shade roller so that as the roller is rotated the catch plates are free to move into and out of engagement with the teeth of the usual relatively stationary pintle.

The main object of the present invention is to provide means for automatically forming and assembling the catch plates and their supporting disk from continuous strips of sheet metal as they are automatically fed into the machine.

In other words, I have sought to successively stamp the blanks for the supporting disk from one continuous trip of sheet metal; to successively stamp the catch plates from a pair of continuous parallel strips of sheet metal, to deposit the catch plates in pairs upon each supporting disk as the catch plates and disk blanks are successively formed; to bend the guide flanges of the supporting disk across adjacent portions of the plates; to simultaneously bend the four corners of the supporting disk into position for attachment to the roller, and to finally expel the completed attachment as the parts thereof are assembled.

Other objects and uses relating to specific parts of the apparatus will be brought out in the following description.

In carrying out the objects stated, a plurality of, in this instance four, upright die-supporting plungers —1—, —2—, —3— and —4— are arranged in parallel spaced relation lengthwise of the machine for relative vertical movement in suitable guides in a main supporting frame —5— toward and from an underlying horizontal die supporting bed —6— which is preferably mounted on supoprting legs —7— to form a part of the main frame.

A cam shaft —8— is journaled in suitable bearings on the upper portion of the frame —5— so as to extend lengthwise of the frame across the upper ends of the plungers and is provided with a corresponding number of cams —9—, —10—, —11— and —12— for operating their respective plungers —1—, —2—, —3— and —4— toward the bed —6— at regular intervals during the rotation of said cam shaft.

A separate cam shaft —13— is journaled on the frame —5— parallel with but in a plane below and at the rear of the shaft —8— and is provided with separate cams —14—, —15—, —16— and —17— for operating a corresponding number of levers —14′—, —15′—, —16′— and —17′— which are pivotally mounted on the frame —5— for engaging and returning their respective plungers to their uppermost starting positions.

A clutch collar —18— is fastened to the cam shaft —8— and is provided with an axially slidable key —19— normally spring-pressed into driving engagement with a pulley —20— which is loosely mounted on the collar —18— and adapted to be connected to any available source of power for continuous rotation.

The inner end of the key —19— is provided with a shoulder —19'— adapted to be engaged by a spring-operated cam-pawl —21— for automatically withdrawing the key from the pulley —20— and thereby stopping the rotation of the cam shaft when desired.

The cam pawl is mounted on the frame of the machine and is normally held out of the path of the key —19— against the action of its operating spring as —22— by means of a hand lever —23— and a detent —24—, said lever being resilient to permit it to be sprung into and out of engagement of the detent as may be required in stopping and starting the cam shaft —8— and mechanisms driven thereby.

An additional cam shaft —25— is journaled in suitable bearings on the main supporting frame parallel with the cam shafts —8— and —13— and preferably in a plane below the die supporting bed —6— and also in the vertical plane of the cam shaft —8— and plungers —1—, —2—, —3— and —4—.

This cam shaft —25— is provided with a plurality of, in this instance three, cams —26—, —27— and —28— for operating a corresponding number of vertically movable plungers —29—, —30— and —31— which latter are movable in guide openings in the die supporting bed —6— in vertical alinement with the plungers —2—, —3— and —4— for purposes hereinafter described.

Figure 2:
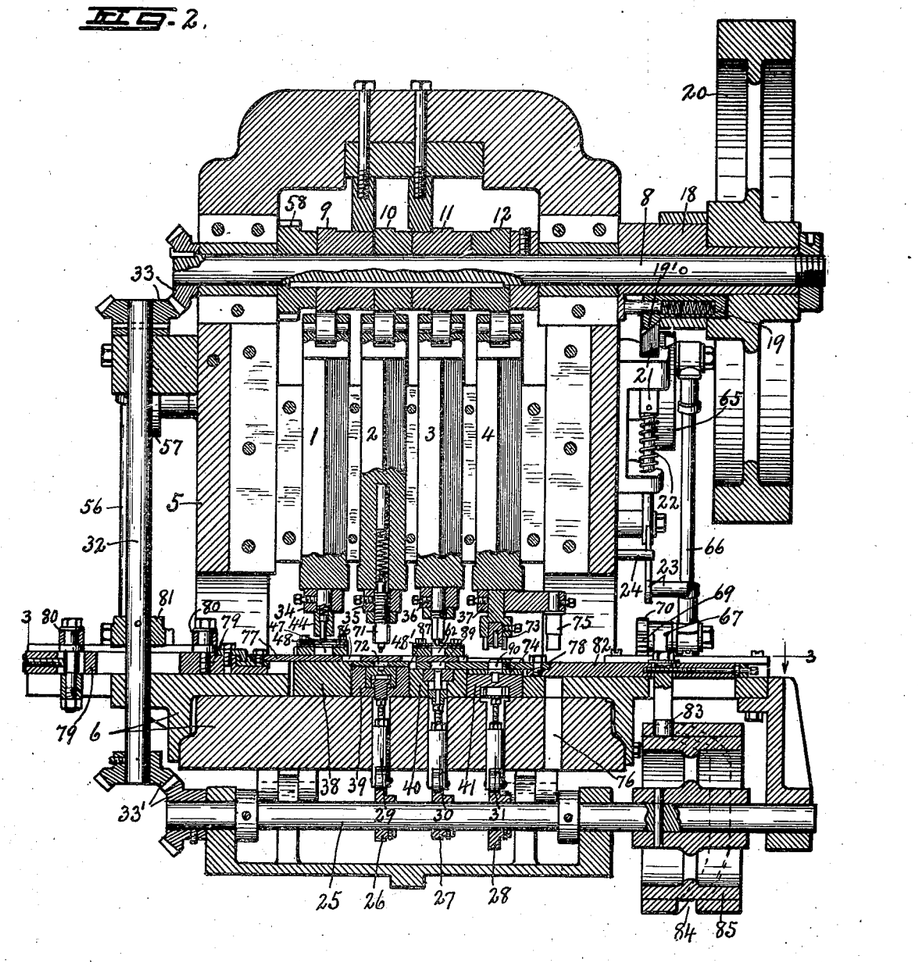
Figure 2 is a longitudinal vertical sectional view of the upper portion of the main supporting bed and superposed mechanism taken on line 2—2, Figure 1.

Rotary motion is transmitted from the cam shaft —8— to the cam shaft —25— through the medium of an upright shaft —32— and upper and lower sets of bevel gears —33— and —33'—, Figure 2.

The lower ends of the plungers —1—, —2—, —3— and —4— are provided with separate die holders —34—, —35—, —36—, and —37— which are removably secured thereto for receiving and supporting suitable dies adapted to cooperate with underlying dies which are carried by separate die supporting blocks —38—, —39—, —40— and —41— on the upper face of the die supporting bed —6— as shown more clearly in Figure 2.

These die supporting blocks —38—, —39—, —40— and —41— are secured edge to edge to the upper face of the bed plate —6— lengthwise of the machine and directly under the lower ends of the plungers —1—, —2—, —3— and —4— so as to lie in substantially the same horizontal plane but are preferably elongated transversely of the bed plate —6— for purpose presently described.

Figures 11, 12, 13, 14, 15, 16:
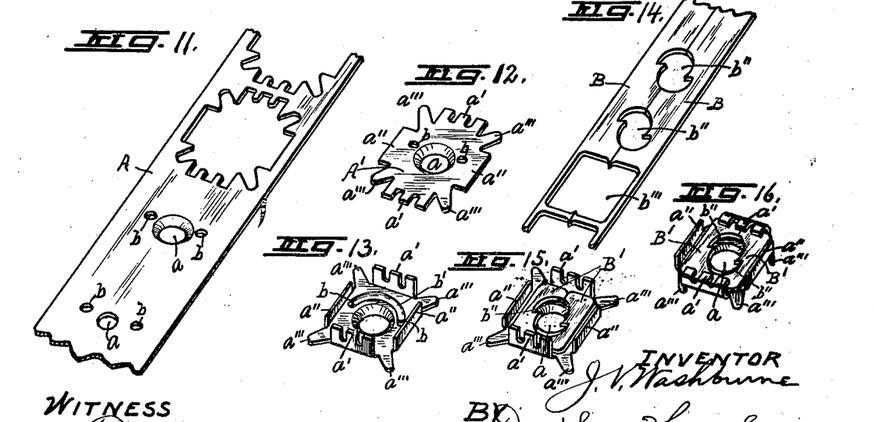
Figure 11 is a perspective view of a portion of the sheet metal from which the blanks for the supporting disks are formed showing the successive stages of forming the blanks.
Figure 12 is a perspective view of the detached disk blank.
Figure 13 is a perspective view of the blank after the guide flanges have been bent in planes at right angles to the main body showing also the groove for receiving the adjacent end of the roller retracting spring.
Figure 14 is a perspective view of a portion of the sheet metal strips from which the catch plates are formed showing the successive stages of forming said plates.
Figure 15 is a perspective view of the disk shown in Figure 13 with the catch plates deposited therein.
Figure 16 is a perspective view of the completed shade roller attachment with two of the opposite longitudinal flanges bent over the adjacent portions of the catch plates and the corner spurs bent in the opposite direction for engagement with the end of a shade roller.

The die block —34— on the lower end of the plunger —1— is provided with a plurality of, in this instance three, male dies —42—, —43— and —44— arranged in uniformly spaced relation in sequence from front to rear of the supporting block —34— and adapted to cooperate with a corresponding number of companion female dies —45—, —46— and —47— on the underlying block —38— to form what may be termed the disk blank shown in Figure 12 for receiving and supporting the catch plates shown in Figures 15 and 16.

The distance between the centers of the cooperative dies is slightly greater than the length of the disk blank so that the latter may be stamped from a stock strip as —A— of sheet metal without material waste.

A guide —48— is mounted in a horizontal position upon the upper face of the die block —38— so as to extend transversely thereof across the female dies —45—, —46— and —47— and is provided with vertical openings therethrough for receiving the male dies —42—, —43— and —44—.

Figure 3:
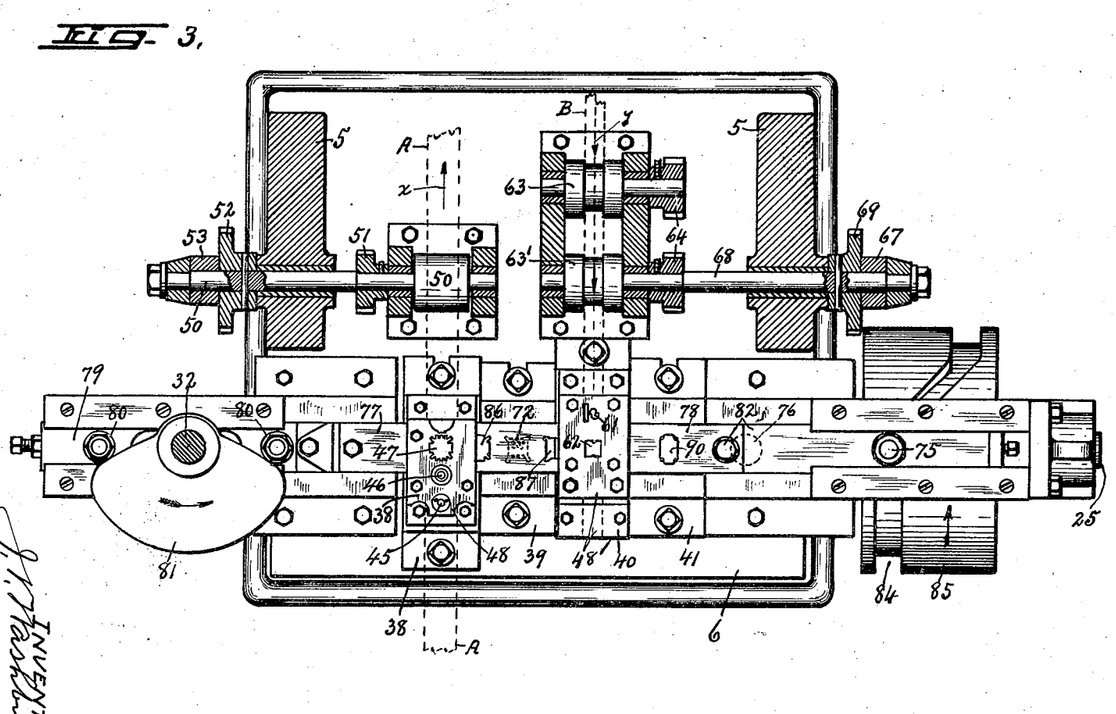
Figure 3 is a horizontal sectional view taken in the plane of line 3—3, Figure 2.

The sheet metal strip —A— is fed lengthwise intermittingly step by step through the guide —48— one die space at a time in the direction indicated by arrow —x—, Figure 3, and at each period of rest the plunger —1— and male dies carried thereby are pressed downwardly into co-action with the corresponding female dies to form the blank shown in Figure 12 and to simultaneously form the central opening in the portion of the strip which is forming the next succeeding blank.

That is, the punching dies —42— and —45— cooperate to form a relatively small cylindrical opening as —a— centrally in the strip —A— at one period of rest of said strip.

At the next period of rest the hole —a—, previously made, is enlarged and countersunk by the next succeeding dies —43— and —46—. At the next period of rest of the strip the punching dies —44— and —47— cut the disk blank as —A'— from the strip; these operations being repeated at the periods of rest between each step by step movement of the strip —A—.

Figure 4:
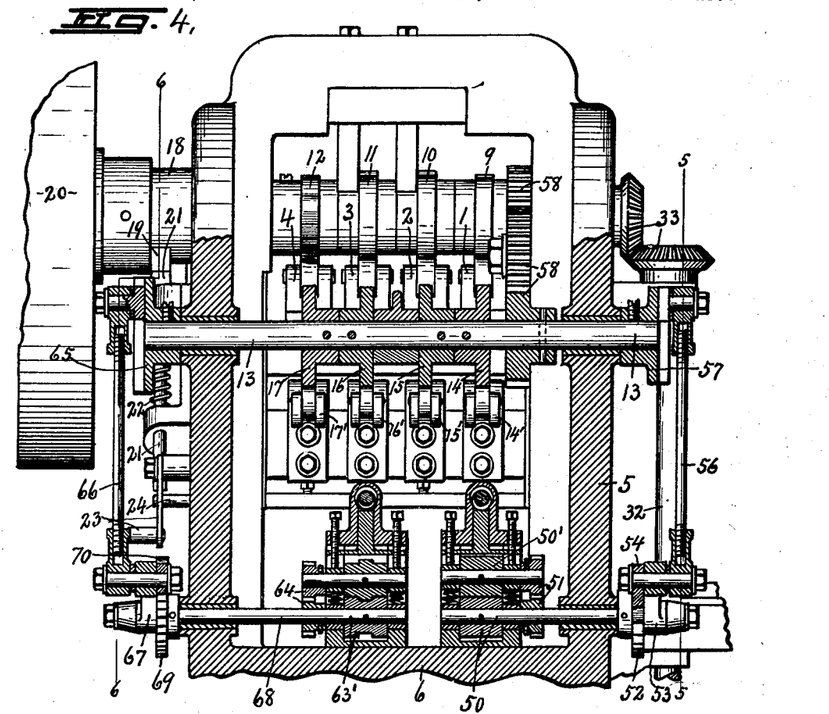
Figure 4 is a longitudinal vertical sectional view in the plane of line 4—4, Figure 6.

The step by step endwise movement of the strip —A— is preferably effected by mechanical means consisting in this instance of a pair of feed rollers —50— and —50'— which are geared together by gears —51—, Figure 4, to rotate positively in unison and are adapted to be rotated intermittingly and synchronously with the cam shaft —8— in such manner as to feed the strip —A— one die space at a time following each blanking operation of the plunger —1—.

Figure 5:
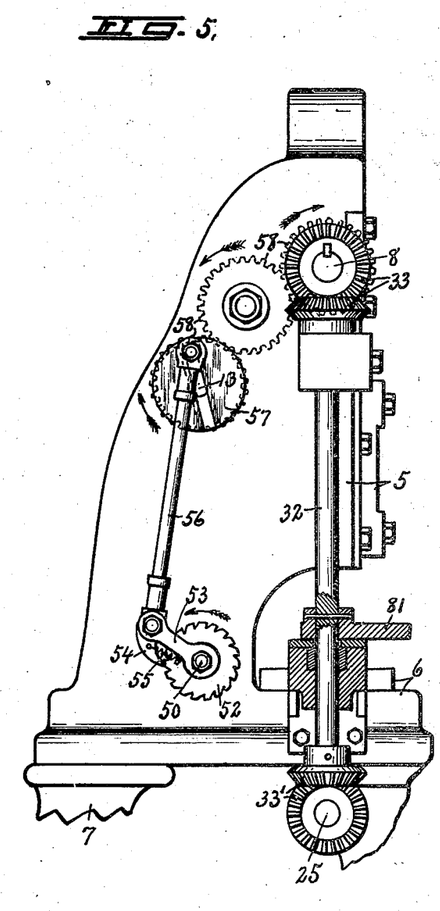
Figures 5 and 6 are transverse vertical sectional views taken respectively in the planes of lines 5—5 and 6—6, Figure 4.

For this latter purpose the supporting shaft for the lower feed roll —50— is provided with a ratchet wheel —52— tight thereon and upon this shaft is also loosely mounted one end of an oscillating arm —53— having its other end provided with a pivoted pawl —54— spring pressed into engagement with the teeth of the ratchet wheel by a spring —55—, Figure 5.

The outer end of the arm —53— is connected to one end of a pitman —56— having its other end eccentrically connected to a disk —57— on the corresponding end of the cam shaft —13— which is geared to the driving shaft —8— by gears —58—, Figure 4.

The connection between the pitman —56— and disk —57— is adjustable to vary the throw of the oscillating arm —53— and thereby to regulate the angular movement of the feed rollers —50— and —50'— and resultant distance of feed of the strip —A— corresponding to the distance between the dies —42—, —43— and —44—.

These gears —58— not only serve to transmit motion from the main driving shaft —8— to the cam shaft —13— for synchronizing the movements of said shafts but also synchronize the movement of the feed rolls —50— and —50'— with both of the cam shafts —8— and —13— in such manner as to cause the desired step by step lengthwise movement of the sheet metal strip —A— at the proper time with reference to the cycle of movement of the plunger —1—.

The cam shaft —13— is preferably driven continuously at the same rate of speed as the shaft —8— and through the medium of the pitman —56— and pawl —54— effects an angular movement of the feed rolls —50— and —50'— once during each rotation of the cam shaft —13—.

The cams —9— and —14— are constructed and arranged to alternately and positively depress and elevate the plunger —1— without objectionable lost motion at each complete revolution of the corresponding shafts —8— and —13— and at the same time to allow the plunger to dwell in its uppermost position during practically one-half revolution of each shaft during which period the feed rolls —50— and —50'— are operated to advance the strip —A— one die space, it being understood that when the plunger is being depressed the feed rolls —50— and —50'— and strip —A— will be at rest.

Figure 17:
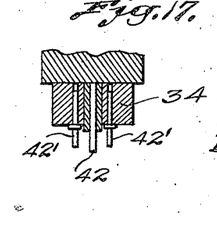
Figure 17 is a detail sectional view taken on line 17—17, Figure 2.

A pair of punches —42'—, Figure 17, are also mounted upon the die holder —34— at opposite sides of the punch —42— for making relatively small holes —b— in corresponding portions of the strip —A— so as to facilitate the formation of a substantially semicircular groove or channel —b'— in the plate —A'— for receiving the adjacent end of the re-winding spring commonly used in shade rollers.

Figure 9:
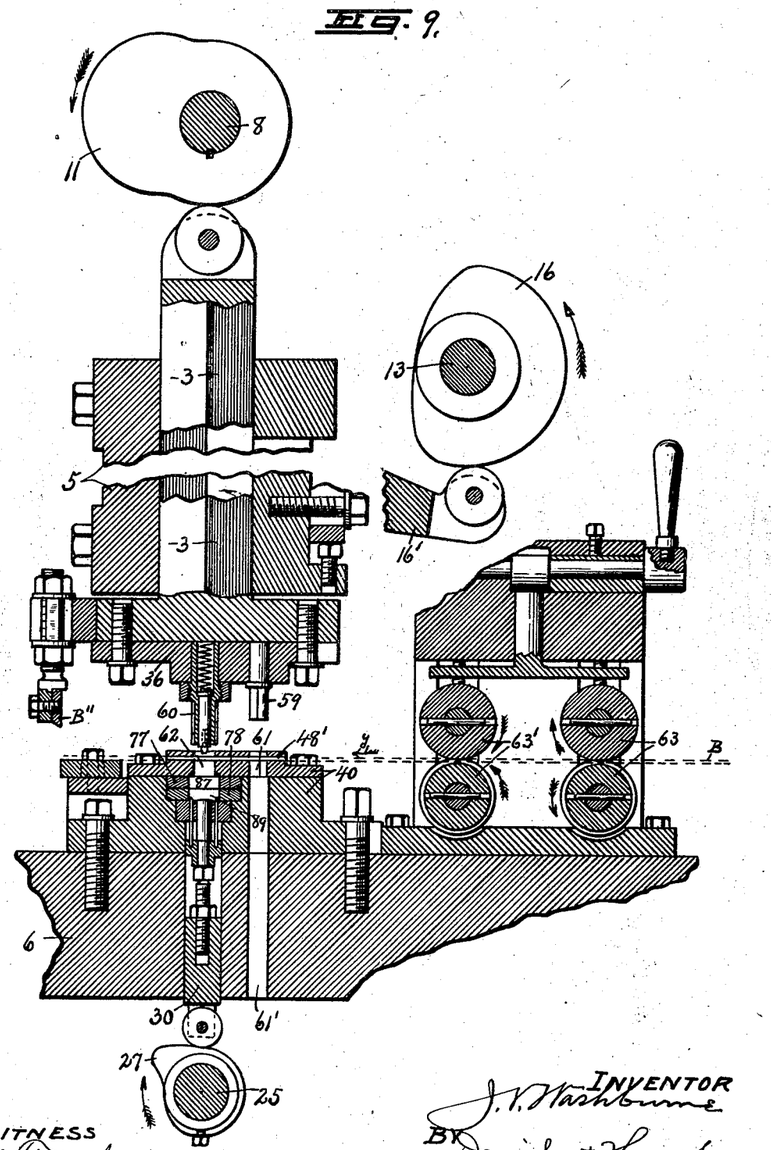

Suitable male punching dies —59— and —60— Fig. 9, are mounted on the die block —36— on the lower end of the plunger —3— to cooperate with companion female dies —61— and —62— in the underlying die block —40— to form the catch plates as —B'—, Figures 15 and 16, from a pair of sheet metal strips —B—, Figure 14, said male and female dies being arranged in spaced relation transversely of the bed plate —6— a distance slightly greater than the length of the catch plates to enable the latter to be cut from the strips without material waste.

The die block —40— is provided with a strip guide —48'— parallel with, but in longitudinally spaced relation from, the guide —48— for the strip —A—.

The pair of sheet metal strips —B— are arranged edge to edge and in that relation are intermittingly fed step by step through the guide —48'— a distance corresponding to the distance between centers of the punches —59— and —60— at each movement, said strip —B— being fed in a direction opposite to that of the strip —A— or in the direction indicated by arrow —y—, Figures 3 and 9.

This intermittent step by step lengthwise movement of the strips —B— is preferably effected by means of separate pairs of rollers —63— and —63'—, Fig. 9, those of each pair being arranged one over the other, the lower rollers being provided with axially spaced flanges for engaging the outer longitudinal edges of the strips —B— and thereby holding their inner adjacent edges in contiguous relation as the strips are fed through the guide —48'—.

The rollers —63— and —63'— of each pair are geared to each other for positive rotation by gears —64—.

Intermittent rotary motion is transmitted to the lower front feed roll —63'— through the medium of a disk —65— on the outer end of the shaft —13— opposite the disk —57—, said disk being eccentrically connected to one end of a pitman —66— having its other end connected to an oscillating arm —67— which is loosely mounted on the adjacent end of a separate lengthwise shaft —68— which is journaled in suitable bearings in the main frame coaxial with the shaft —50— as shown in Figure 3.

The outer end of the shaft —68— is provided with a ratchet wheel —69— adapted to be engaged by a pawl —70— on the outer end of the oscillating arm —67— for rotating the shaft —68— as the pitman —66— is moved endwise by the rotation of the disk —65—, said pitman being adjustably connected to its disk to vary the throw of the oscillating arm —67— and thereby to vary the angular movement of the feed rollers —63'— and resultant feed of the strips —B— at each operation.

This angular movement of the feed roll —63— and —63'— is adjusted to feed the strips —B— a distance corresponding to the spacing of the male dies —59— and —60— and their corresponding female dies —61— and —62—.

The dies —59— are employed to punch openings as —b''— in the strip —B— after different portions thereof are registered with said dies during successive movements thereby forming similar but reverse half openings in the adjacent edges of each of the strips —B—.

The dies —60— and —62— serve to block out the previously perforated portions of the strips to form the catch plates —B'— thereby forming additional openings as —b'''— in the strip —B—.

The blank —A'— is formed with opposite end flanges —a'—, opposite side flanges —a''— and corner spurs —a'''—, all of which are to be bent at an angle to the main body for retaining and guiding the catch plates and for fastening the disk to the shade rollers.

*Bending and assembling.*

After the disk blanks —A'— are stamped out of the strip —A— they are carried forwardly between male and female forming dies —71— and —72— which are mounted respectively on the die holder —35— on the lower end of the plunger —2— and upon the die holder —39— on the bed —6— where they are pressed into the form shown in Figure 13 with the flanges —a'— and —a''— bent up at substantially right angles to the main body.

The disk thus formed is then carried forwardly into registration with, but below the female die —62— for receiving the catch plates as they are formed by the dies —60— and —62—.

Figure 10:
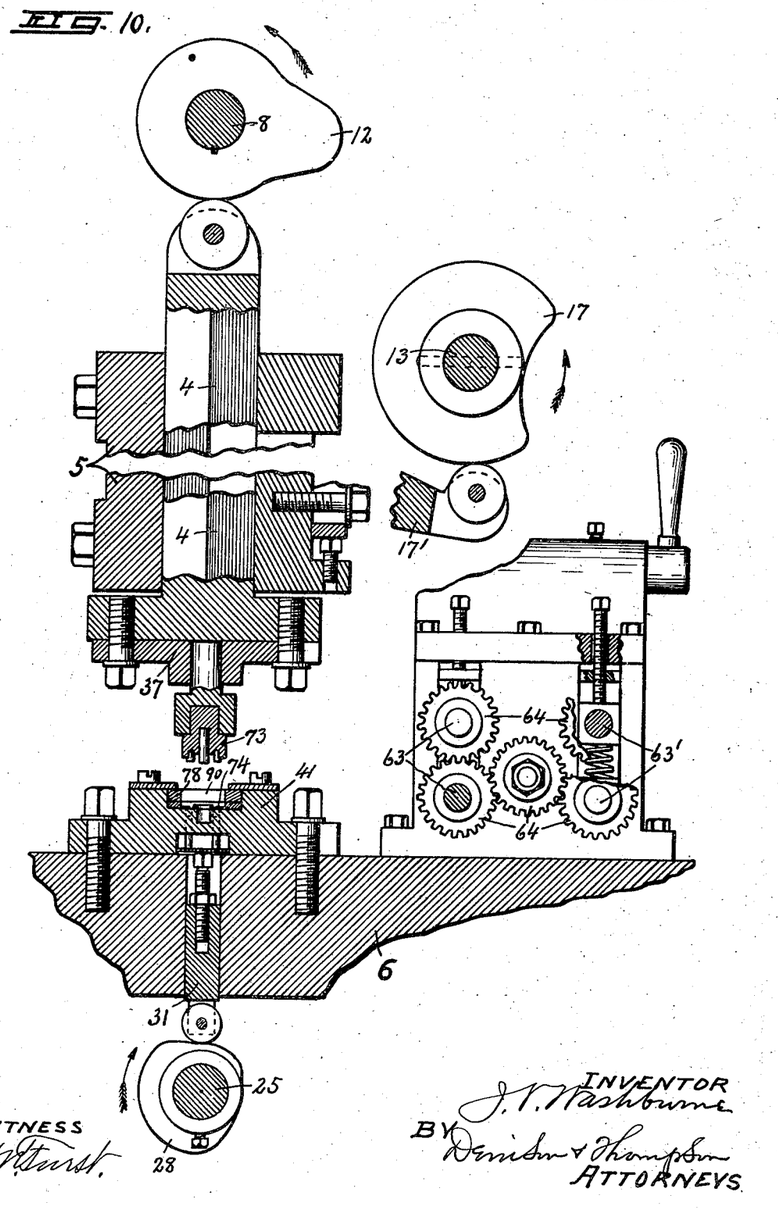

When the catch plates have been deposited on the partially formed disk —A'— by the operation of the dies —60— and —62— the disk with the catch plates therein is carried forwardly into registration with and between a male die —73— on the die holder —37— and a female die —74— on the holder —41—, Figures 2 and 10, said dies —73— and —74— being operated at the proper time to complete the assembly of the catch plates —B'— within and upon the supporting disk —A'— as shown in Figure 16 in which the flanges —a'— are overturned inwardly upon the adjacent ends of the catch plates while the corner spurs —a'''— are bent in the opposite direction at substantially right angles to the main body for securement to the end of a shade roller in the usual manner.

After the disk —A'— and catch plates —B'— are assembled in the manner just described they are carried forwardly beneath an expelling die —75— which forces the assembled parts downwardly through an opening —76— in the bed plate —6— and enables said assembled parts to be collected in an underlying receptacle.

As illustrated, the means for effecting this transfer of the disk blanks —A'—, catch plates —B'— and the assembled catch plates and disk into registration with and between the successive dies comprises cooperative carrier plates —77— and —78— mounted in suitable guides in the die holders —38—, —39—, —40— and —41— and bed plate —6— in overlapping relation one above the other for movement lengthwise of the machine and transversely of the strip guides —48— and —48'—.

The outer end of the carrier —77— is operatively connected to a sliding head —79— on the upper face of the supporting bed —6—, said head being provided with longitudinally spaced roller bearings —80— for engaging diametrically opposite sides of a rotary cam —81— which is secured to the upright shaft —32— for reciprocating the carrier —77— in synchronism with the movements of the plungers —1—, —2—, —3— and —4—.

The outer end of the other carrier —78— is secured to a sliding head —82— on the upper face of the bed plate —6— and is provided with a pendant roller bearing —83— engaging in a cam groove —84— in the periphery of a cam wheel —85— which is secured to the lower lengthwise camshaft —25— for reciprocating the carrier —78— in synchronism with the movements of the plungers —1—, —2—, —3— and —4—, and carrier —77—.

The sliding carrier —77— is provided with a plurality of, in this instance two, openings —86— and —87— arranged in uniformly spaced relation lengthwise of the carrier corresponding to the spacing of the plungers —1—, —2—, —3— and —4— while the throw of the cam —81— for operating the sliding carrier —77— also corresponds to the spacing of the holes —86— and —87— so as to move said slide —77— forwardly and return one hole-space at a time or during each revolution of the cam —81—.

The sliding carrier —78— is provided with a plurality of, in this instance two, openings or holes —89— and —90— in longitudinally spaced relation corresponding to the distance between the centers of the plungers —3— and —4— for carrying the partially assembled parts from the dies —60— and —62— to the finishing dies —73— and —74— and thence from the finishing dies to the expelling dies —75— and —76— where the completed articles are discharged from the machine ready for use.

Figure 1:
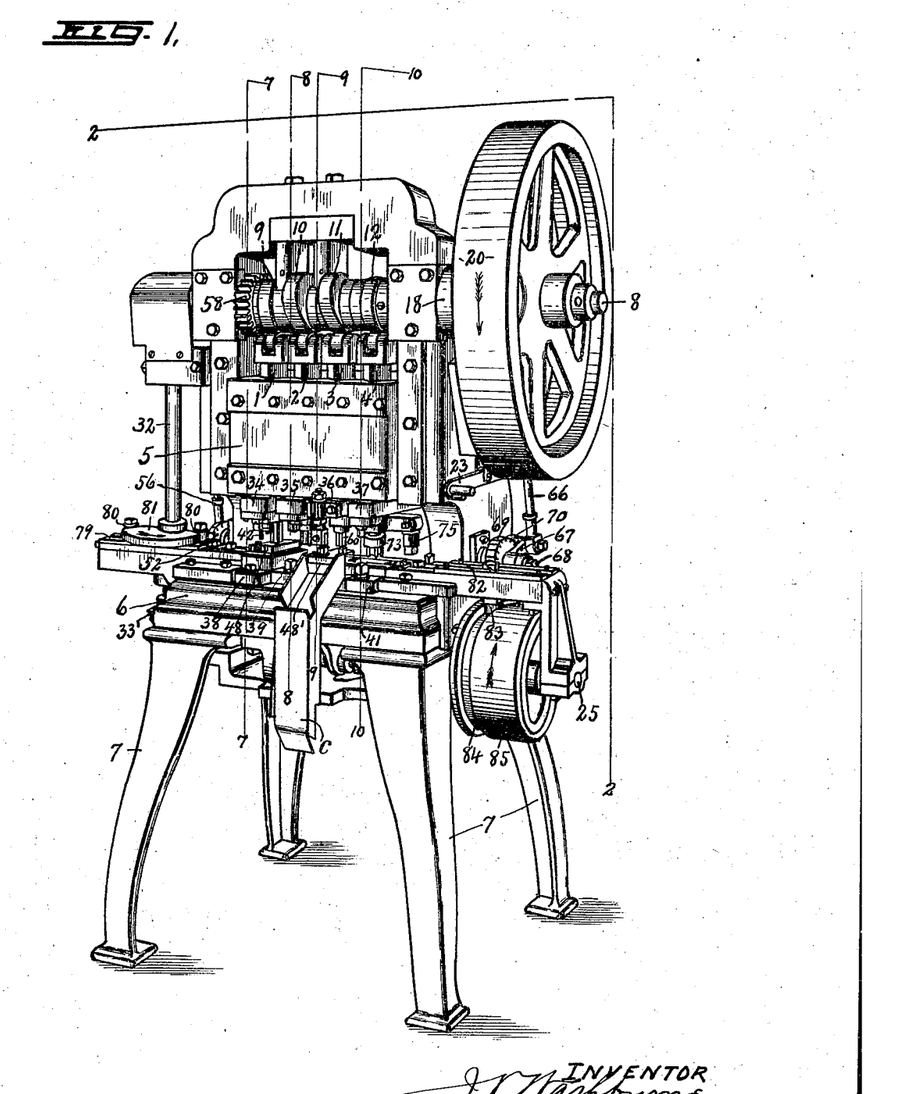
Figure 1 is a perspective view of a machine for forming and assembling the parts of shade roller attachments.

The waste from the strips —B— resulting from punching holes in the catch plates by the dies —59— and —61— is discharged through an opening —61'— in the bed —6—, Figure 9, while the remaining portions of the strips —B— after the catch plates have been stamped therefrom are fed forwardly through a guide chute —C— and thence out of the way under the machine as shown in Figure 1.

The major portions of opposite halves of the cam —81— are concentric with its axis of rotation to establish periods of dwell in the two extreme positions of the carrier —77— actuated thereby, the radius one concentric portion being considerably greater than the opposite concentric portion as shown in Fig. 3.

The major portions of opposite halves of the cam groove —84— in the cam wheel —85— are offset axially a distance corresponding to the distance between the holes —89— and —90— in the carrier —78—, said offset portions being parallel to establish periods of dwell of the carrier —78— in its extreme inward and outward positions.

*Operation.*

While the plunger —1— is dwelling in its uppermost position the strip —A— is fed rearwardly one step into the guide —48— and allowed to dwell in that position during which the carrier —77— will have been brought to a position to register its opening —86— with the dies —44— and —47—.

The plunger —1— is then operated to stamp out from said strip the blank disk shown in Figure 12 and to force said disk into the registering opening —86— in the carrier —77— and in the same operation of the plunger —1— the holes —a— are punched and counter-sunk in the next succeeding portion of the strip by the dies —42— and —43—.

Immediately following the raising of the plunger —1— from the carrier —77—, said carrier is moved lengthwise to the right hand of Figure 3 to register its opening —86— with the blank disk —A'— therein with the plunger —2— which is then in an elevated position.

The carrier —77— is then allowed to dwell in its shifted position while the plunger —2— is operated to force the disk blank —A'— from the opening —86— into the underlying die —72— and thereby to bend up the flanges —a'— and —a''— to the position shown in Figure 13, the same die also producing the semi-circular depression —b'—.

The plunger —2— is then raised and the carriage —77— returned to its starting position to bring its opening —86— into registration with the plunger —1— and its opening —87— into registration with the plunger —2— whereupon the plunger —29— will be operated by its cam —26— to force the partially formed disk shown in Figure 13 from the die —72— into the registering opening —87— in the carrier —77—.

Immediately upon the recession of the plunger —29— the carrier —77— is again moved to the right hand, Figures 2 and 3, to bring its opening —87— with the partially formed disk —A'—, Figure 13, therein into registration with the plunger —3— during which time the carrier —77— is moved toward the left hand of Figures 2 and 3 to bring its opening —89— into registration with the plunger —3— and at the same time the double strip —B— is fed forwardly in the guide —48'— beneath the plunger —3— whereupon said plunger —3— is operated to sever the catch plates —b'— from the strip —B— and to force them into the partially formed disk in the registering opening —87— of the carrier —77— and simultaneously forcing the partially formed disk with the catch plates therein into the registering opening —89— of the carrier —78—. Immediately preceding the downward movement of the plunger —3—, the plunger —30— is elevated to cause the upper end thereof to temporarily support the disk in the carrier —77— against entrance into the carrier —78— while the catch plates are being formed by the downward movement of the plunger —3— and to guide said catch plates into the disk which is then in the carrier —77—, the plunger —30— being then allowed to recede as the plunger —3— continues its downward movement to force the disk with the catch plates therein into the carrier —78—.

Immediately following the raising of the plunger —3— the slide —77 is returned to its starting position and the slide —78— is moved to the right hand, Figures 2 and 3, to bring its opening —89— with the disk and catch plates therein into registration with the plunger —4— whereupon the plunger —4— is operated to force the disk with the catch plates therein from the registering opening —89— in the slide —78— into the underlying die —74— and simultaneously to bend the flanges —a'— inwardly over the adjacent edges of the catch plates —B'— and also to bend the corners —a'''— downwardly as shown in Figure 16 thus completing the formation and assembly of the attachment.

Immediately following the raising of the plunger —4— the slide —78— is shifted inwardly toward the left hand of Figures 2 and 3 to bring its opening —90— into registration with the plunger —4— and die —74— whereupon the plunger —31— is raised to force the completely formed disk with the catch plates therein from the die —74— into the registering opening —90—.

The slide —78— is then shifted to the right hand of Figures 2 and 3 to bring its opening —90— with the completed disk and catch plates therein into registration with the die —75— on the plunger —4— and while the slide —78— is dwelling in this position the plunger —4— is again operated to cause its die —75— to force the completed disk with the catch plates thereon from the registering opening —90— in the slide —78— into the discharge opening —76— from which the completed disks with the catch plates therein are collected.

Figure 8:
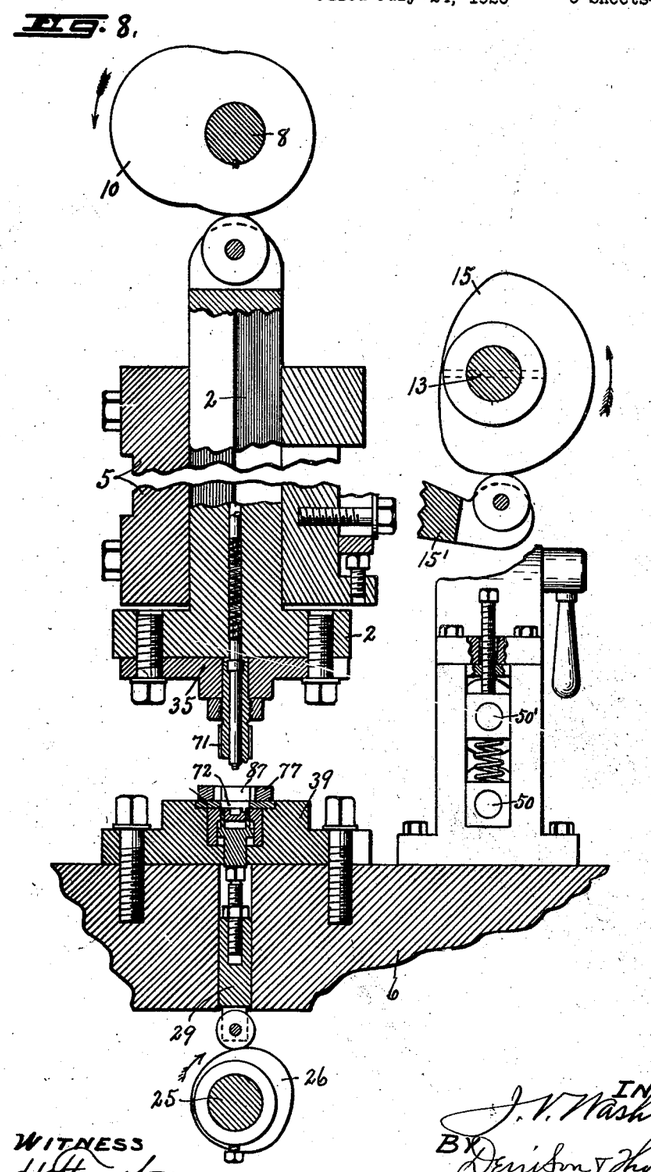

It will be noted from the arrows on the cams —81— and —85—, Figure 3, that the carrier —78— has just reached the limit of its inward stroke while the carriage —77— is just approaching the limit of its inward stroke under which conditions the cams —26—, —27—, —28— on the shaft —25— will be in the positions shown in Figures 8, 9 and 10 respectively and will move in the direction indicated by the arrows.

Under these conditions, the cams —9—, —10—, —11— and —12— on the shaft —8— will be in the positions shown in Figures 7 to 10 inclusive while the cams —14—, —15—, —16— and —17— on the shaft —13— will be in the positions shown in the same figures so that all of the plungers —1—, —2—, —3— and —4— will then be elevated to their extreme limits, the plungers —1— and —4— having returned to their uppermost positions to dwell in those positions during slightly more than one-half revolution of the shaft —8— while the plungers —2— and —3— are about to be depressed.

The cam shaft —25— is rotated at about the same speed as the cam shafts —8— and —13— and with the cams —26—, —27— and —28— in the positions shown in Figures 8, 9 and 10, the plunger —29— is just returning from its extreme upper position while the plungers —30— and —31— are beginning their upward movement, the cam —27— being sufficiently abrupt to cause the upper end of the plunger to move a limited distance upwardly while the plunger —3— is descending and then to descend as the plunger —3— continues its downward movement in transferring the disk with the catch plates therein from the carrier —77— to the carrier —78— as previously explained.

The disk —57—, Figure 5 is in position to begin the operation of the feed rolls —50— and —50'— as the plunger —1— returns to its uppermost position for feeding an uncut portion of the tape —A— beneath the die holder —34—.

Figure 6:
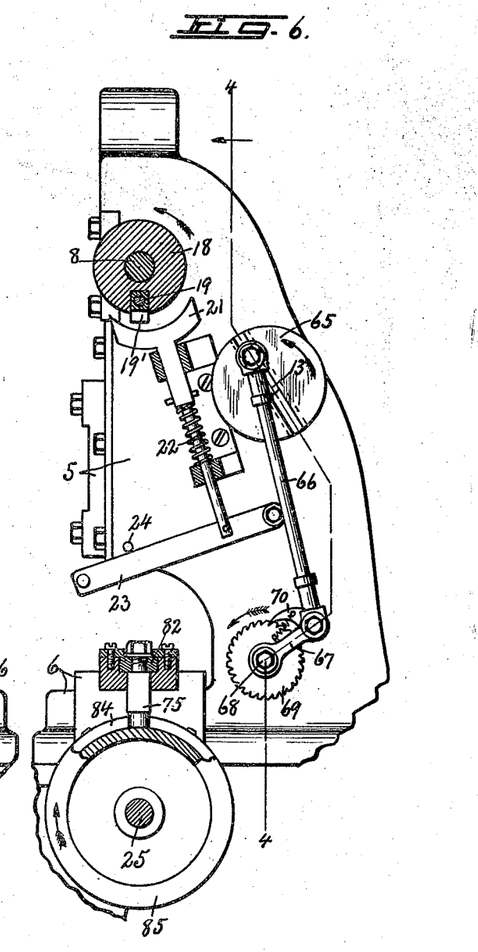
Figure 7:
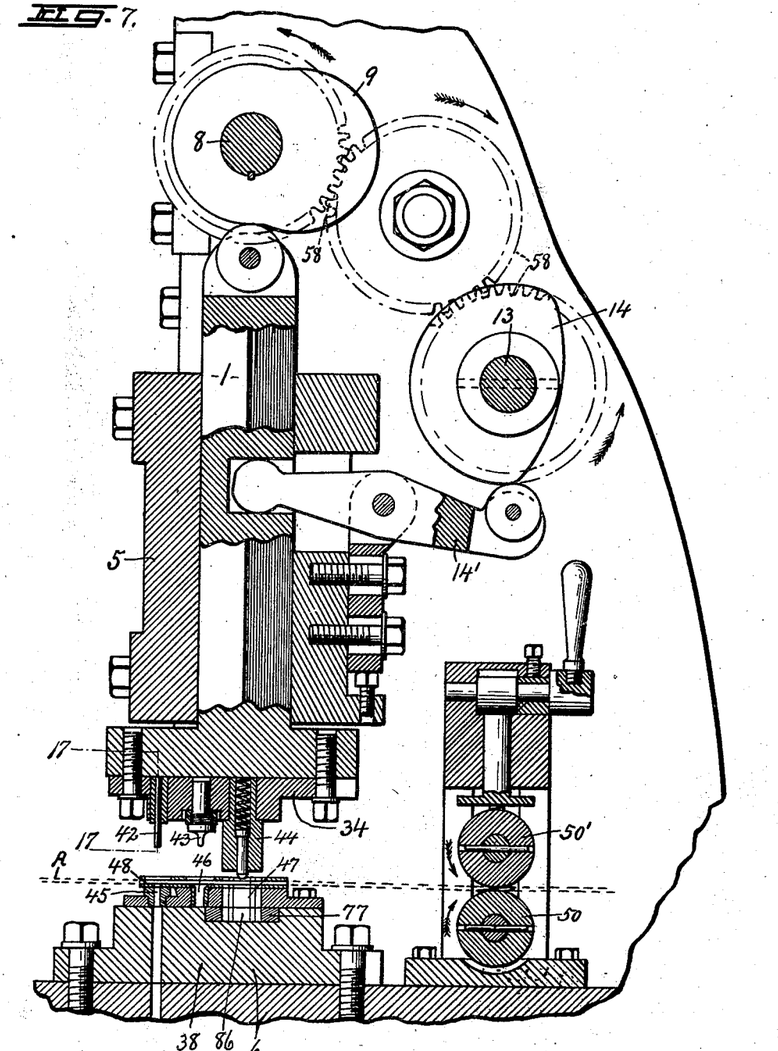
Figures 7, 8, 9 and 10 are enlarged transverse vertical sectional views taken in the planes of lines 7—7, 8—8, 9—9 and 10—10 respectively, Figure 1.

The disk —65—, Figure 6, is a shown in a position as just having completed the operation of the feed rolls —63— and —63'—, while the plunger —3— is engaged with the concentric portion of the cam —11—, so that, as the plunger —3— is being depressed by the high part of the cam —11—, the pawl —70— will be trailing along the teeth of the ratchet wheel —69— without effecting the operation of the feed rolls —63— and —63'— which have just previously been operated to feed an uncut portion of the strips —B— between the dies —60— and —62—.

As the plunger —3— is brought to its punching position the portion thereof which has been previously stamped out by the dies —60— and —50— will be cut off by a knife as —B″— to allow the severed portions to fall into the chute —C—.

What I claim is:—

1. In a machine for forming and assembling the sheet metal supporting disk and catch plates of a shade roller attachment, a female disk-blanking die and a female disk-forming die arranged in spaced relation, a reciprocally movable carrier having an opening adapted to register with the blank-forming die, means for feeding a sheet metal strip into registration with the disk-blanking die, a punching die cooperating with the disk-blanking die for cutting the disk blank from the strip and forcing it into the registering opening of the carrier, said carrier with the disk blank therein being movable to bring the disk blank into registration with the disk-forming die, and an additional punching die cooperating with the disk-forming die for bending opposite edges of the disk at an angle to the main body thereof.

2. In a machine for forming and assembling the sheet metal supporting disk and catch plates of a shade roller attachment, a female disk-blanking die and a female disk-forming die arranged in spaced relation, a reciprocally movable carrier having an opening adapted to register with the blank-forming die, means for feeding a sheet metal strip into registration with the disk-blanking die, a punching die cooperating with the disk-blanking die for cutting the disk blank from the strip and forcing it into the registering opening of the carrier, said carrier with the disk blank therein being movable to bring the disk blank into registration with the disk-forming die, and an additional punching die cooperating with the disk-forming die for bending opposite edges of the disk at an angle to the main body thereof, said carrier having an additional opening in spaced relation to the first-named opening corresponding to the spacing of the dies to register with the disk-forming die when the first-named opening is registered with the disk-blanking die, a female plate-forming die in spaced relation to the disk-forming die corresponding to the spacing of the opening in the carrier, means for forcing the partially formed disk from the disk-forming die into the additional opening when registered therewith whereby the movement of the carrier will bring the additional opening with the partial formed disk therein into registration with the plate-forming die, an additional carrier having an opening adapted to register with the plate-forming die, means for feeding a pair of sheet metal strips edge to edge into registration with the plate-forming die, and a punching die cooperating with the plate-forming die for punching the catch plates from the sheet metal and forcing them into the partially formed disk and also for forcing the disk with the plates therein into the opening in the additional carrier.

3. In a machine for forming and assembling the sheet metal supporting disk and catch plates of a shade roller attachment, a female disk-blanking die and a female disk-forming die arranged in spaced relation, a reciprocally movable carrier having an opening adapted to register with the blank-forming die, means for feeding a sheet metal strip into registration with the disk-blanking die, a punching die cooperating with the disk-blanking die for cutting the disk blank from the strip and forcing it into the registering opening of the carrier, said carrier with the disk blank therein being movable to bring the disk blank into registration with the disk-forming die, and an additional punching die cooperating with the disk-forming die for bending opposite edges of the disk at an angle to the main body thereof, said carrier having an additional opening in spaced relation to the first-named opening corresponding to the spacing of the dies to register with the disk-forming die when the first-named opening is registered with the disk-blanking die, a female plate-forming die in spaced relation to the disk forming die corresponding to the spacing of the opening in the carrier, means for forcing the partially formed disk from the disk-forming die into the additional opening when registered therewith whereby the movement of the carrier will bring the additional opening with the partially formed disk therein into registration with the plate-forming die, an additional carrier having an opening adapted to register with the plate-forming die, means for feeding a pair of sheet metal strips edge to edge into registration with the plate-forming die, and a punching die cooperating with the plate-forming die for punching the catch plates from the sheet metal and forcing them into the partially formed disk and also for forcing the disk with the plates therein into the opening in the additional carrier, a female finishing die in spaced relation to the plate-forming die, means for shifting the additional carrier to bring its opening with the disk and catch plates therein into registration with the female finishing die, and a punching die cooperating with the finishing die for overturning two of the opposite disk flanges over and upon the adjacent portions of the catch plates and for simultaneously bending the corners of the disk at an angle to the main body to complete the formation and assembly of the attachment.

4. In a machine for forming and assembling the sheet metal parts of a shade roller attachment of the character described, disk-blanking dies, disk-forming dies, plate-forming dies and disk and plate-assembling dies, all arranged in sequence in uniformly spaced relation along a straight line, means for feeding sheet metal between the disk-blanking dies, means for feeding sheet metal between the plate forming dies, a reciprocally movable carrier having an opening movable alternately into and out of registration with the disk-blanking dies and disk-forming dies, means for operating one of the disk-blanking dies to stamp the disk-blank therefrom and to force it into the registering opening of the carrier whereby the disk-blank will be brought into registration with the disk-forming dies as the opening is registered therewith, means for operating one of the disk-forming dies to form the disk blank from the carrier into the female disk-forming die, said carrier having an additional opening alternately registerable with the disk-forming dies and plate-forming dies, means for forcing the partially formed disk from the female disk-forming die into said additional opening to be brought into registration with the plate-forming dies as the additional opening is registered therewith, an additional reciprocally movable carrier having an opening alternately registerable with the plate-forming dies and with the finishing dies as the additional carrier is reciprocated, means for operating one of the plate-forming dies to stamp the sheet metal catch plates therefrom and to force them into the partially formed disk in the registering opening in the first-named carrier and to simultaneously force the disk with the plates therein into the registering opening in the second-named carrier to be brought into registration with the finishing dies and means for opening one of the finishing dies for clinching portions of the disk with the plates therein over and upon adjacent portions of the plates.

5. In a machine for forming and assembling the disks and catch plates of shade roller attachments, disk-forming dies, plate-forming dies, means for intermittingly feeding the disk stock step by step to the disk-forming dies, means for operating the disk-forming dies at each step by step movement of the disk stock to partially form the disks, means for intermittently feeding the plate stock step by step to the plate-forming dies, means for carrying the partially formed disks to the plate-forming dies, means for operating the plate-forming dies at each step by step movement of the plate stock to form the plates and deposit them upon the registering disk, means for displacing the disk with the plates thereon from the plate-forming dies, and means for overturning the edges of the disk upon the adjacent portions of the plates as the disk with the plates thereon are displaced from the plate-forming dies.

6. In a machine for forming and assembling the disks and catch plates of shade roller attachments, disk-blanking dies, disk-forming dies, catch plate-forming dies and finishing dies arranged in sequence in a straight line, means for intermittingly feeding the disk stock step by step to the disk-blanking dies, means for operating the disk-blanking dies for punching the blanks therefrom, means for carrying the disk-blanks to the forming dies, means for operating the forming dies to partially form the disks as they are successively registered therewith, means for carrying the partially formed disks to the plate-forming dies, means for feeding the plate stock step by step between the plate-forming dies, means for operating the plate-forming dies to punch the plates therefrom, and to deposit said plates upon the registering partially formed disk, means for carrying the partially formed disk blank with the plates thereon to the finishing dies, and means for operating the finishing dies to overturn portions of the disks upon adjacent portions of the catch plates.

7. In a machine for forming and assembling the disks and catch plates of shade roller attachments, finishing dies, a reciprocally movable slide having an opening movable into and out of registration with said dies, means for depositing the disks with the catch plates therein in said opening when out of registration with the dies to be carried by the slide into registration with the dies, and means for operating the dies to bend the edges of the disks over and upon the adjacent portions of the catch plates as the disks with the catch plates therein are successively registered with the dies.

8. In a machine for forming and assembling the disks and catch plates of shade roller attachments, disk-blanking dies and disk-forming dies arranged in sequence along a straight line, a slide reciprocally movable across the dies and provided with an opening movable into and out of registration with said dies, means for feeding the disk stock step by step between the blanking dies, means for operating the blanking dies to punch the disk-blanks from the stock and to force them into the registering opening in the slide at each step by step movement of the stock, means for operating the slide to shift the opening with the disk blank therein into registration with the forming dies, means for operating the disk-forming dies to bend up the edges of the disk blanks as they are successively presented to the forming dies by the slide.

In witness whereof I have hereunto set my hand this 12th day of July, 1926.

JAMES V. WASHBURNE.